United States Patent Office 3,554,934
Patented Jan. 12, 1971

3,554,934
TREATMENT OF FOAM PLASTICS TO RENDER THEM FIRE-RESISTANT
Alvin R. Ingram, Murrysville, Pa., assignor to Sinclair-Koppers Company, a partnership
No Drawing. Filed Sept. 15, 1967, Ser. No. 668,199
Int. Cl. C08f 47/02; C08j 1/26
U.S. Cl. 260—2.5
6 Claims

ABSTRACT OF THE DISCLOSURE

An aqueous mixture of a thermosetting phenol-formaldehyde resin and a self-extinguishing agent, ammonium bromide, is impregnated into the spaces of an incompletely fused thermoplastic bead foam. The finished product is produced by heating the foam, containing the thermosetting resin and self-extinguishing agent, to remove water and cure the thermosetting resin.

BACKGROUND OF THE INVENTION

Rigid close-celled foams can be produced by heating expandable particles or beads of thermoplastic materials such as styrene polymers. The particles generally contain a volatile organic blowing agent which is a gas or which boils at a temperature below the softening point of the thermoplastic material which causes the particles to expand when they are subjected to heat. The particles are placed in a mold cavity defining the shape of the desired finished article. The particles are heated above their softening point, for example, by steam or other suitable heating means whereupon the particles expand to fill the mold cavity and fuse together.

The particles can be either placed directly in the mold or they can be pre-expanded before being placed in the mold as, for example, described in U.S. Patent No. 3,023,175.

The resulting rigid foam structure has excellent heat insulation properties and sufficient strength for use in building applications, for example, in wall and floor insulation. Slabs of the foam material can be used in on-site construction by placing them between the inner and outer walls of a structure or they can be incorporated into pre-fabricated building panels having facing materials bonded to either one or both sides of the foam. A serious problem which has heretofore curtailed the use of such foams in the building industry is the fact that the styrene polymer foams are flammable and because of the resulting fire hazard some means is needed to render the foams fire retardant.

Heretofore, foams have been rendered self-extinguishing by adding various organic bromine compounds to the styrene polymer particles during their preparation. It has also been found that the effectiveness of the bromine-containing self-extinguishing agents can be increased by adding various compounds, termed synergists, for example, certain organic peroxides, which permit the use of a smaller amount of bromine-containing compound in the foam. While these compositions have achieved a degree of success, serious problems remain, for example, in regard to the molding characteristics of the particles. The organic bromine compounds act to plasticize the thermoplastic polymer and this causes excessive shrinkage of the foam during molding and poor fusion of the particles. Additionally, the self-extinguishing agents themselves tend to be unstable and with time the foam may lose its self-extinguishing properties.

I have now found a process for producing self-extinguishing plastic foam structures which avoids the aforementioned difficulties with respect to the the molding and produces a foamed product having superior strength, heat resistance, and self-extinguishing characteristics.

BRIEF SUMMARY OF THE INVENTION

In accordance with this invention, self-extinguishing foam plastic structures are prepared by heating small particles of an expandable thermoplastic polymer to cause the particles to expand and incompletely fuse together. The incomplete fusion results in a foam structure containing void spaces between the particles. An aqueous solution of a phenol-formaldehyde thermosetting resin and ammonium bromide is impregnated into these spaces in the foam structure and the structure is then heated to remove the water and to cure the thermosetting resin.

DETAILED DESCRIPTION

Thermoplastic polymers useful in the invention, for example, are derived from vinyl aromatic monomers including styrene, divinyl benzene, vinyl toluene, isopropyl styrene, alpha-methyl styrene, nuclear dimethyl styrene, chlorostyrene, vinyl naphthalene, and so forth, as well as polymers prepared by the copolymerization of vinyl aromatic monomers with monomers such as butadiene, alkyl methacrylates, alkyl acrylates, and acylonitrile wherein the vinyl aromatic monomer is present in at least 50 percent by weight. For the purpose of convenience, these polymers are referred to herein as styrene polymers.

The expandable polymers are in the form of particles or beads which contain blowing agents. The blowing agents are compounds which are gases or which will produce gases on heating. Such blowing agents include aliphatic hydrocarbons from 1–7 carbon atoms in the molecule, for example, methane, ethane, propane, butane, pentane, hexane, heptane, cyclohexane, and halogenated derivatives thereof which boil at a temperature below the softening point of the polymer.

While the size and shape of the expandable thermoplastic polymer particles is not critical to the invention, it is preferred that the polymer particles have a particle size before expansion predominantly in the range of less than 16 mesh screens (U.S. Standard Sieve Series) but not smaller than 40 mesh. Particles larger than 16 mesh produce foams with voids which are to large for effective retention of the impregnating solution prior to curing. Particles smaller than 40 mesh produce too small a volume of void space to permit sufficient solution to be impregnated into the foam.

Suitable thermosetting resins are those derived from the reaction of phenol and formaldehyde such as phenol-formaldehyde resins from the reaction of 1.2 moles of formaldehyde per mole of phenol. The resins should be dilutable without precipitation by an aqueous ammonium bromide solution to form a clear solution of less than 500 centipoises viscosity containing 30% by weight of resin solids and 25% by weight of ammonium bromide. The solution should be stable for 60 minutes at 23° C., i.e., it must not separate into two layers or increase in viscosity to more than 1000 centipoises. Preferably, the resins are employed as aqueous solutions containing from about 15 to 30 weight percent of resin solids. The impregnating solution should cure to an acetone insoluble polymer in 60 minutes at 60° C. The ammonium bromide not only provides the halogen necessary to render the foam product self-extinguishing but also acts as a curing agent to cross-link the thermosetting resin to form an insoluble polymer. The ammonium bromide is added in an amount sufficient to render the foam fire retardant generally in the range of 10–25 percent by weight of the aqueous resin-self-extinguishing agent solution.

Preferably, the polymer particles are pre-expanded prior to molding to a bulk density of from 0.75 to 2.5 pounds per cubic foot as described, for example, in U.S. Pat. No.

3,023,175. The foams are molded under conditions somewhat milder than conventionally employed to produce a foam structure which is self-supporting and which will not crumble upon handling but which has void spaces within the foam. The degree of fusion should range between 15 and 70% and, preferably, between 20 and 40%. The degree of fusion is determined by tearing a molded piece and counting the untorn beads in a one-hundred-bead area. The degree of fusion is 100 minus the number of untorn beads. The exact molding conditions will vary from formulation to formulation, from mold to mold, and with the type of heating media employed. In steam molding, for example, steam back pressure conditions of approximately 10% less pressure than would be required for a fully fused foam are employed. The exact conditions to be employed with any particular mold, formulation, and type of heating media, can readily be determined by those skilled in the art.

The resin-self-extinguishing agent mixture is impregnated into the incompletely fused foam by any convenient manner sufficient to cause the solution to flow into and fill the void spaces remaining between the particles of the foam structure. For example, by immersion of the foam structure in the aqueous solution. In order to assure complete and rapid impregnation of the foam, it is desirable to use impregnating techniques wherein pressure or vacuum or a combination of both is utilized, for example, by placing the foam in a chamber and subjecting the foam to vacuum. Thereafter, the treating solution is introduced into the chamber under atmospheric pressure or above to cause the solution to flow into the evacuated void spaces. If desired, a wetting agent can be added to the treating solution to aid in the impregnation, for example, non-ionic surfactants such as fatty acid monoesters of polyoxyethylene glycol.

The amount of treating solution incorporated into the foam should be sufficient to substantially fill the void spaces in the foam. Generally, the proportions of the cured foam structure will be about 30 to 70 weight percent thermoplastic polymer, about 18 to 42 weight percent thermosetting resin, and about 12 to 28 weight percent ammonium bromide. The relative proportions of each component can be readily calculated from the difference in the densities of the untreated and cured foam and the composition of the treating solution.

After the treating solution has been impregnated into the foam, the foam is heated at a temperature sufficient to cure the resin and remove water at a practical rate but below a temperature where shrinkage of the foam would result. Temperatures of 50° C. or above provide a reasonable rate of cure and water removal. Temperatures higher than 70° C. should be avoided because they may cause the foam to shrink. To provide a satisfactory cure, a minimum time of about 1 hour per inch of foam thickness is required.

My invention is further illustrated by, but not limited to, the following examples wherein parts are parts by weight unless otherwise indicated.

EXAMPLE I

Expandable polystyrene beads containing 6.5 weight percent of n-pentane and having a particle size between 25 and 40 mesh U.S. Standard Sieve Series were pre-expanded by exposing them to atmospheric steam for 2–4 minutes such that they expanded to a bulk density of about 1.4 pounds per cubic foot. The beads were permitted to age for 24 hours in the atmosphere and an aliquot of the pre-expanded beads was then molded into a 20 x 20 x 12" foam block by placing the beads in a non-perforated ring mold supported on a vertically movable perforated steam chest. The chest was raised until the mold pressed tightly against the bottom of another perforated steam chest. Steam was introduced into the mold to a steam back pressure of 10–11 pounds per square inch gauge to cause the beads to expand and lightly fuse together. After the steam was shut off, cooling water was circulated through the steam chest to cool the structure to a self-supporting condition after which time it was removed from the mold. The block had a density of 1.4 pounds per cubic foot. A portion of the foam was torn and the degree of bead fusion determined by counting the number of untorn beads in a ten-bead square area. The degree of fusion was 30%.

Cubes 3 x 3 x 3" were cut from the larger block using a band saw. A 3 x 3 x 3" cube was weighted and submerged in an impregnation solution contained in a beaker. The impregnation solution comprised an aqueous solution containing 24% by weight of solids of a phenol-formaldehyde resin (Bakelite BRL-1100 60% solids, pH 8), Union Carbide Plastics Co., and 25% by weight of ammonium bromide. The beaker containing the submerged foam block was placed in a vacuum chamber and the chamber evacuated to a vacuum of 27 inches of mercury for 15 minutes to remove the air from the void spaces in the foam. The chamber was then returned at atmospheric pressure. The block was kept in the solution for 7 minutes at atmospheric pressure during which time the solution became impregnated into the evacuated foam. The foam block was then removed from the treating solution, placed in a curing oven at a temperature of 55° C. for 4 hours to remove the water and cross-link the resin. The cured foam had a density of 2.2 pounds per cubic foot. A self-extinguishing test was conducted on a foam strip cut from the block having the dimensions ½ x 1 x 2". The strip was suspended vertically in a draft-free hood and ignited by holding a ½" flame from a microburner in contact with the bottom of the strip for 5 seconds. The time to extinguishment of sustained burning after the flame was removed from the strip was 1 second. The burned portion of the foam strip retained its structural integrity without collapse and no flaming drops of polymer were observed to fall from the test specimen. This illustrates an additional advantage of the composition of the invention in that previous self-extinguishing foams, when exposed to a flame, and are burned, rapidly melt and collapse and emit molten flaming drops of polymer which act to spread the fire. Therefore, the composition of the invention, when used in building construction applications, aids in maintaining the structural integrity of the structure and does not melt and thereby spread the fire.

As a further illustration of the fire-resistant properties of the foam, the following test was conducted on a 2 x 2 x 1" strip cut from the cured foam block. The strip was clamped to one face of an asbestos board over a circular hole in the board. A piece of filter paper was placed over the hole on the opposite face of the board and the assembled board, foam, and paper secured in a vertical position. The tip of a 1½ inch flame from a propane torch was placed in contact with the portion of the foam surface which was directly in line with the hole in the board. The time to burn-through was measured as the time of ignition of the filter paper on the opposite side of the board. The burn-through time was 90 seconds. When the test was repeated with conventional self-extinguishing foam molded from DYLITE SE–51–C expandable polystyrene beads, the burn-through time was 5 seconds.

EXAMPLE II

An aliquot of the pre-expanded beads of Example I was molded to a foam block having a density of 1.4 pounds per cubic foot and a degree of fusion of 40% by the procedure of Example I. A 3 x 3 x 3" saw-cut specimen of foam was submerged in an impregnating solution containing 30 weight percent solids of the phenol-formaldehyde resin used in Example I and 25% weight percent ammonium bromide. The submerged specimen was placed in a vacuum chamber and subjected to a vacuum of 27 inches of mercury for 15 minutes, after which the chamber was returned to atmospheric pressure with the foam block remaining submerged for ten minutes so that the block was impregnated with solution. The block was removed from the impregnating solution and cured in air oven at 60° C. overnight. The foam density after curing was 3.5 pounds per cubic foot. A self-extinguishing test was conducted on a ½ x 1 x 2" specimen cut from the impregnated block using the self-extinguishing test procedure described in Example I. The specimen had a self-extinguishing time of between 1 and 2 seconds. A burn-through test was conducted in accordance with the procedure of Example I. The foam had a burn-through time of 85 seconds.

EXAMPLE III

A lightly fused 3 x 3 x 3" specimen from the foam block molded in Example II was impregnated with solution containing 18% solids of the phenol-formaldehyde resin and 25% by weight solids of ammonium bromide using the impregnating procedure described in Example II. The treated, oven cured specimen (3 hours at 65° C.) had a foam density of 2.3 pounds per cubic foot. A ½ x 1 x 2" strip cut from the specimen gave a self-extinguishing time of 1 second and a 2 x 2 x 1" strip cut from the specimen had a burn-through time of 35 seconds.

I claim:

1. A process for producing a self-extinguishing, foam plastic structure comprising heating small particles of an expandable, vinyl aromatic polymer to cause said particles to expand and incompletely fuse together to form a foamed structure having a degree of fusion of between about 15 and 70 percent and containing void spaces between said particles, impregnating into said spaces in said structure an aqueous mixture of a phenol-formaldehyde thermosetting resin and ammonium bromide, and heating said structure to remove the water and cure said thermosetting resin.

2. A self-extinguishing foam plastic structure prepared by heating small particles of an expandable vinyl aromatic polymer to cause said particles to expand and incompletely fuse together to form a foam structure having a degree of fusion of between about 15 to 70 percent and containing void spaces between said particles, impregnating into said spaces in said structure an aqueous mixture of a phenol-formaldehyde resin and ammonium bromide, and heating said structure to remove the water and cure said thermosetting resin.

3. The process of claim 1 wherein said aqueous mixture contains from about 15 to 30 weight percent of resin solids and from about 10 to 25 weight percent of ammonium bromide.

4. The structure of claim 2 wherein said structure comprises from about 30 to 70 weight percent of vinyl aromatic polymer, from about 18 to 42 weight percent phenol-formaldehyde resin, and from about 12 to 28 weight percent ammonium bromide.

5. A process for producing a self-extinguishing foam plastic structure comprising heating expandable vinyl aromatic polymer particles having a size range predominantly between about 16 and 40 mesh U.S. Standard Sieve Series to cause said particles to expand and incompletely fuse together to form a foam structure having a degree of fusion of between about 15 and 70%, impregnating into said structure an aqueous mixture of from about 15–30 weight percent of solids of a phenol-formaldehyde thermosetting resin, and from 10–25 weight percent of ammonium bromide by immersing said structure in said mixture, removing said structure from said mixture, and heating said structure at a temperature of from about 50° C. to 70° C. for at least one hour per inch of foam thickness to remove the water and cure said thermosetting resin.

6. The process of claim 5 wherein said expandable vinyl aromatic polymer is polystyrene.

References Cited

UNITED STATES PATENTS

| | | | |
|---|---|---|---|
| 2,806,509 | 9/1957 | Bozzacco et al. | 260—2.5B |
| 2,862,834 | 12/1958 | Hiler | 260—2.5B |
| 2,894,918 | 7/1959 | Killoran et al. | 260—2.5B |
| 3,058,927 | 10/1962 | McMaster et al. | 260—2.5B |
| 3,104,196 | 9/1963 | Shannon | 260—2.5B |
| 3,245,829 | 4/1966 | Beaulieu | 260—2.5B |

SAMUEL H. BLECH, Primary Examiner

M. FOELAK, Assistant Examiner

U.S. Cl. X.R.

260—45.9, 844, 846, 848